June 6, 1950  D. G. LIEBIG ET AL  2,510,702
BLOWER ATTACHMENT FOR ROTARY TYPE BALERS
Filed March 17, 1948  2 Sheets-Sheet 1

INVENTOR.
DAN G. LIEBIG
AND ADOLPH J. LIEBIG, JR.
BY Patrick D. Beavers.
ATTORNEY June 6, 1950 D. G. LIEBIG ET AL 2,510,702
BLOWER ATTACHMENT FOR ROTARY TYPE BALERS
Filed March 17, 1948 2 Sheets-Sheet 2
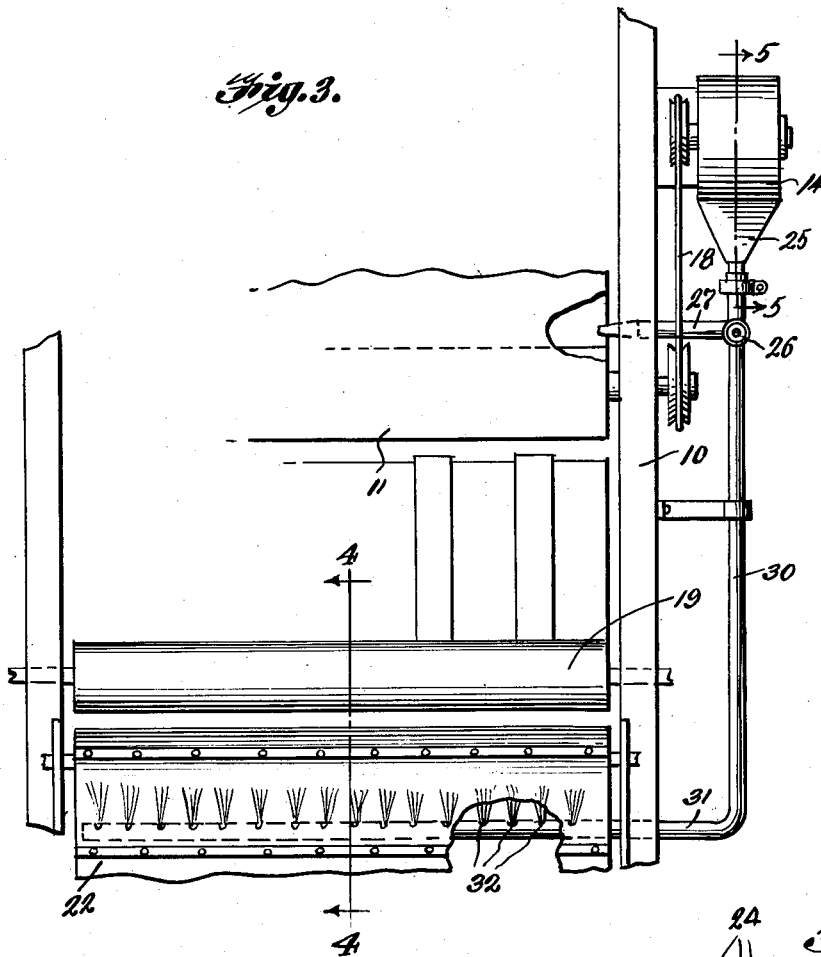
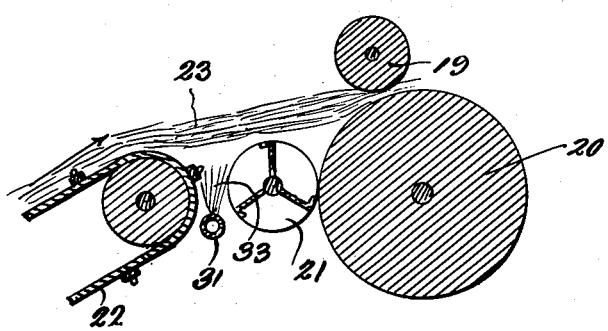
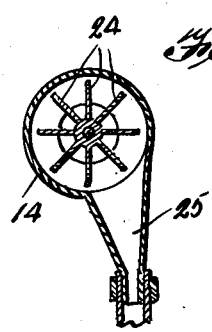
INVENTOR.
DAN G. LIEBIG
AND ADOLPH J. LIEBIG, JR.
BY Patrick D Beavers
ATTORNEY Patented June 6, 1950

2,510,702

UNITED STATES PATENT OFFICE 2,510,702

BLOWER ATTACHMENT FOR ROTARY TYPE BALERS

Dan G. Liebig and Adolph J. Liebig, Jr., Platte Center, Nebr.

Application March 17, 1948, Serial No. 15,436

1 Claim. (Cl. 100—19)

The present invention relates to blower attachment for rotary type balers and it consists in the combinations, constructions and arrangements of parts herein described and claimed.

It is an object of the present invention to provide a blower attachment for rotary type balers, particularly of that type known as "Allis Chalmers," which is adapted to alternatively keep a drive roll forming a part of such mechanisms free from the tendency of hay and the like from becoming enwrapped therearound and to keep leaves and the like from falling from the mechanism and thus becoming lost.

A further object of the invention is the provision of a device of the character set forth above which is simple in construction and operation and efficient and effective in use.

A further object of the invention is the provision of a device of the character above set forth using air under pressure as a means for accomplishing its purposes.

Other and further objects of the invention will become apparent from a reading of the following specification taken in conjunction with the drawings, in which:

Figure 3 is a fragmentary elevational view disclosing certain details of the invention, Figure 4 is a sectional view taken substantially along line 4—4 of Figure 3, and Figure 5 is a sectional view taken along line 5—5 of Figure 3.

Figure 1:
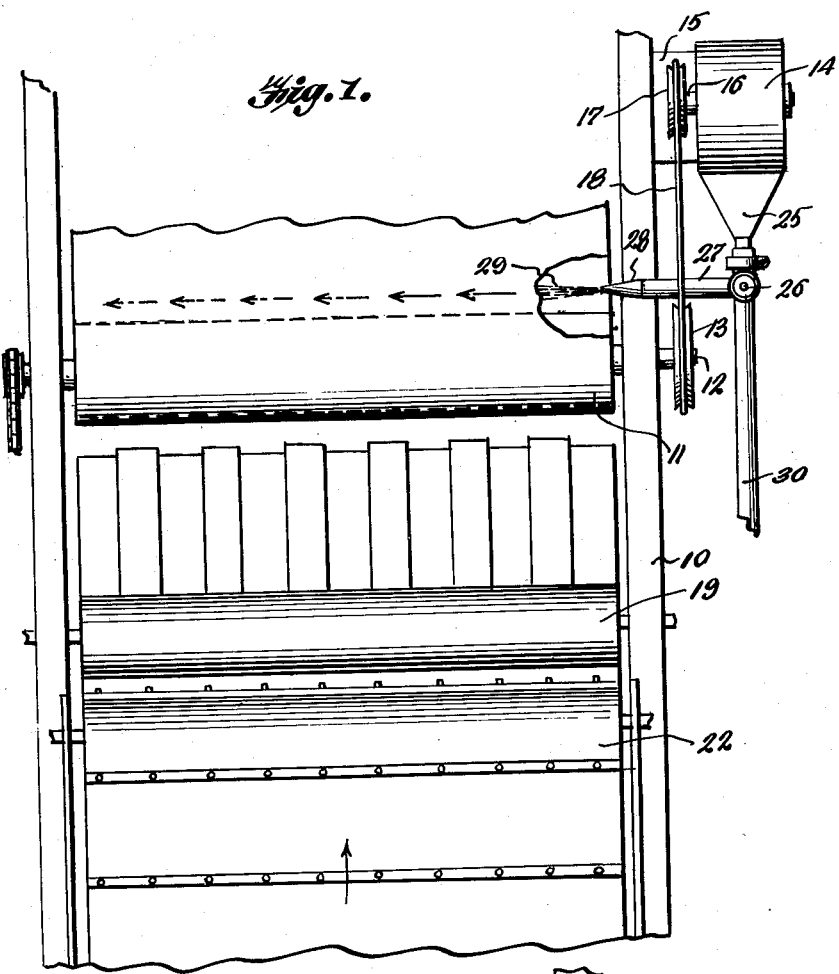
Figure 1 is a fragmentary elevational view of an embodiment of the invention.
Figure 2:
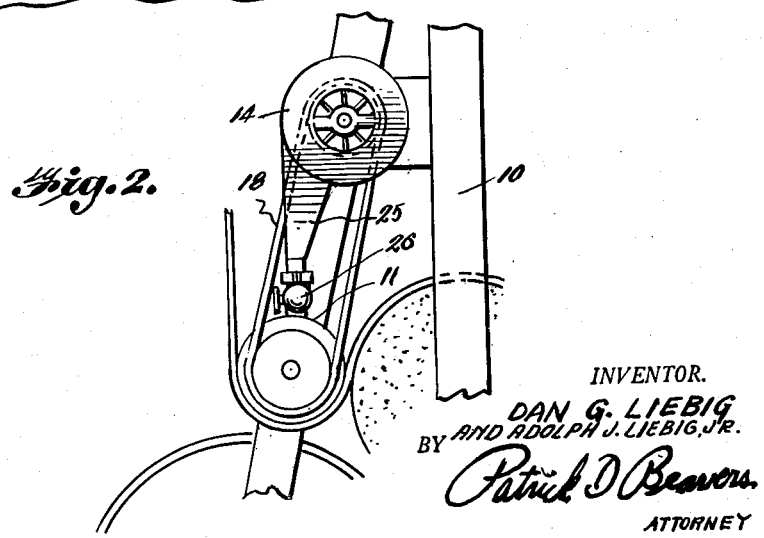
Figure 2 is a fragmentary side elevational view thereof.

Generally there is provided a blower attachment for rotary type balers which comprises a blower or air pump attached to the frame of such a mechanism, adapted to be driven therefrom by means of a pulley or the like and having an outlet pipe leading to a valve which is adapted to control the flow of air through a pipe leading to a nozzle directed transversely of a so-called "upper drive roll" or, alternatively, through a plurality of openings directing an upward flow of air upon a mass of hay or the like proceeding from a conveyor forming a part of the baler to a press roll likewise forming a part of the baler.

Referring more particularly to the drawings, there is shown therein a rotary type baler having a frame 10 in which is transversely mounted an upper drive roll 11 having an axle 12 to the outer end of which is affixed a pulley 13. An air blower 14 is supported by a bracket 15 attached to the frame 10 and is provided with a shaft 16 having a pulley 17 mounted thereon. A belt 18 interconnects the pulleys 13 and 17.

A press roll 19 is transversely mounted in the frame 10, as is a lower drive roll 20 adjacent which is transversely mounted a feeder roll 21. An endless conveyor 22 is transversely mounted adjacent the feeder roll and is adapted to convey hay 23 or the like to the feeder roll and thence between the press roll 19 and lower drive roll 20.

The blower 14 is interiorly provided with a plurality of blades 24 which direct a flow of air through an outlet pipe 25 which communicates with a valve 26 which, in turn, communicates with a laterally extending pipe 27 having a nozzle 28 which is adapted to direct a stream of air, as indicated at 29, along the surface of the upper drive roll 11. The valve 26, which is a conventional manually operable two-way valve, also communicates with a pipe 30 extending downwardly to join a transversely extending pipe 31 having a plurality of openings 32 which are adapted to impart upwardly directed streams of air, as indicated at 33 between the conveyor 22 and the feeder roll 21 upon the moving mass of hay 23.

In operation, it will be apparent that when hay of the prairie type is being baled in the baler in which case there is a tendency for the long strands thereof to become accidentally enwrapped about the upper drive roll 11 between the upper and lower runs of such belt, the valve 26 may be manually operated to direct a blast of air 29 transversely of the upper drive roll thereby to rid the same of such elongated strands of hay, grass or the like. When, however, alfalfa or the like is being baled in the mechanism, the operator may turn the valve 26 to direct the flow of air from the blower to the pipe 31 whereupon the plurality of upwardly directed blasts of air 33 will keep leaves and chaff within the mass of hay 23 moving from the conveyor 22 to the press roll 19, thus not only providing a much cleaner job of baling but also saving a considerable amount of time heretofore utilized in cleaning such chaff and leaves from the machine.

While but one form of the invention has been shown and described herein, it will be readily apparent to those skilled in the art that many minor modifications may be made without departing from the spirit of the invention or the scope of the appended claim.

What is claimed is:

An apparatus of the character described comprising, in combination, a rotary type baler, a blower driven by said baler, an outlet pipe for said blower, an upper drive roll for said baler, a nozzle connected to the outlet pipe and adapted to direct air transversely of said drive roll, a conveyor belt for the baler, a feeder roll for the baler, a pipe connected to the outlet pipe and extending in parallel relation to and between said feeder roll and said belt and having a plurality of openings upon its upper side, and a valve communicating with said outlet pipe for selectively directing air from the blower to the second-named pipe and to the nozzle.

DAN G. LIEBIG.
ADOLPH J. LIEBIG, JR.

REFERENCES CITED

The following references are of record in the file of this patent:

UNITED STATES PATENTS

| Number | Name | Date |
|---|---|---|
| 1,553,217 | Cooper | Sept. 8, 1925 |
| 1,982,997 | Linder | Dec. 4, 1934 |
| 2,377,123 | Bellamy et al. | May 29, 1945 |
| 2,436,508 | Fairbanks | Feb. 24, 1948 |
| 2,469,580 | Scranton | May 10, 1949 |